Feb. 26, 1963 T. J. DRONG 3,078,893
MEAT SLICING APPARATUS
Filed June 29, 1960 3 Sheets-Sheet 1

Inventor
Thomas J. Drong
By Mann, Brown & McWilliams
Attorneys

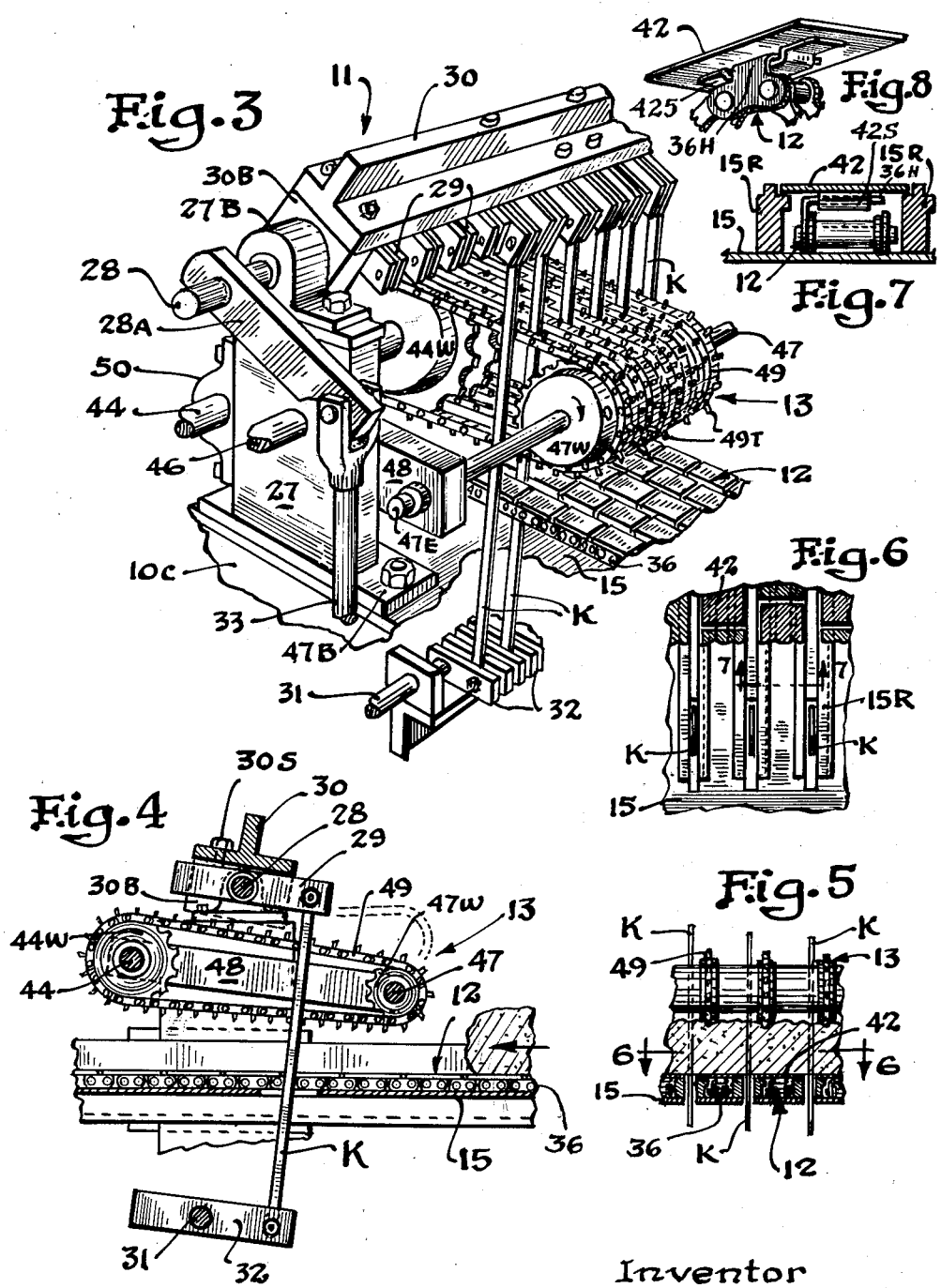

Feb. 26, 1963    T. J. DRONG    3,078,893
MEAT SLICING APPARATUS
Filed June 29, 1960    3 Sheets-Sheet 3
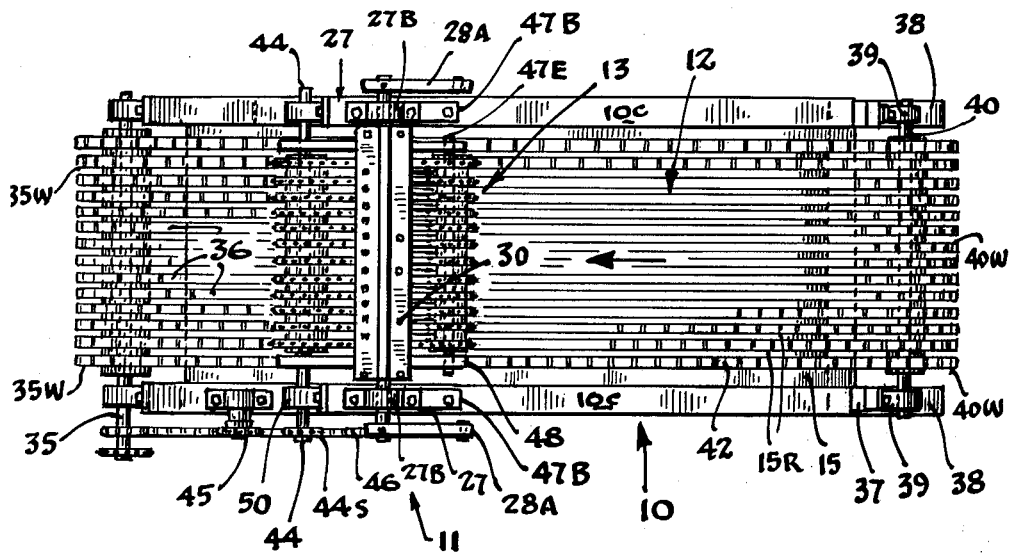
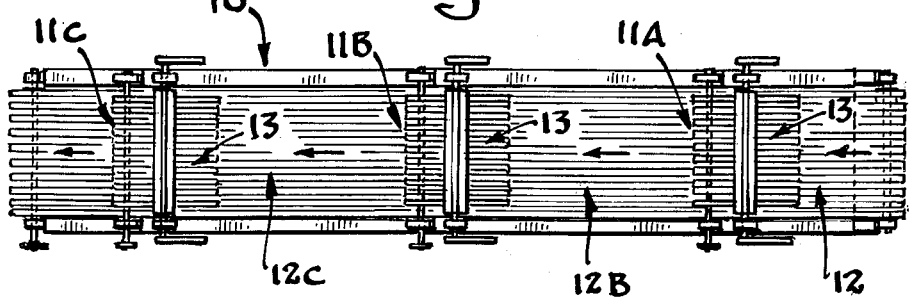
Inventor
Thomas J. Drong
By Mann, Brown & McWilliams
Attorneys United States Patent Office 3,078,893
Patented Feb. 26, 1963

3,078,893
MEAT SLICING APPARATUS
Thomas J. Drong, 5231 S. Sacramento Ave., Chicago, Ill.
Filed June 29, 1960, Ser. No. 39,477
5 Claims. (Cl. 146—153)

This invention relates to a machine for slicing meat and more particularly is concerned with a machine for successively slicing a chunk of meat into pieces of cube form such for example as are commonly used in stew meat.

At present, it is common practice, where a chunk of meat is to be cut into cubes for use as stew meat, to perform the entire operation completely manually. This practice is followed even where large quantities of stew meat are cut to order upon contract with institutions such as hospitals and other large volume users. Manual performance of such operations is not only expensive but the final product is dependent upon the skill of the person cutting the meat. Furthermore, there may be a marked lack of uniformity in the size of the final product.

Accordingly, it is the principal object of the present invention to provide a machine for slicing chunks of meat rapidly and cleanly.

Another object of the present invention is to provide a machine of the above type that is capable of cutting meat into substantially cube form wherein the final pieces of meat will be of substantially uniform size.

It is a further object to provide a machine of this type that is capable of rapidly cutting up vast quantities of meat of a range of sizes.

Other objects and advantages of the invention will be apparent during the course of the following description.

In the accompanying drawings forming a part of the specification and in which like numerals are employed to designate like parts throughout the same—

FIG. 3 is a fragmentary perspective view, on an enlarged scale, illustrating the slicing station arrangement of the machine of FIG. 1;

FIG. 4 is a fragmentary side-sectional view taken through the slicing section of the machine;

FIG. 5 is a transverse cross-sectional view taken at the slicing station;

FIG. 6 is a fragmentary plan view illustrating the conveyor bed construction of the preferred form of the invention;

FIG. 7 is a fragmentary cross-sectional view, on an enlarged scale, taken on the line 7—7 of FIG. 6 and illustrating the guide rib arrangement provided on the conveyor bed;

FIG. 8 is a detailed perspective view, on an enlarged scale, of a link chain and mounting pad arrangement utilized in the transport conveyor of the machine;

FIG. 9 is a top plan view of the machine; and

FIG. 10 is a top plan view of an alternative embodiment of the invention.

Figure 1:
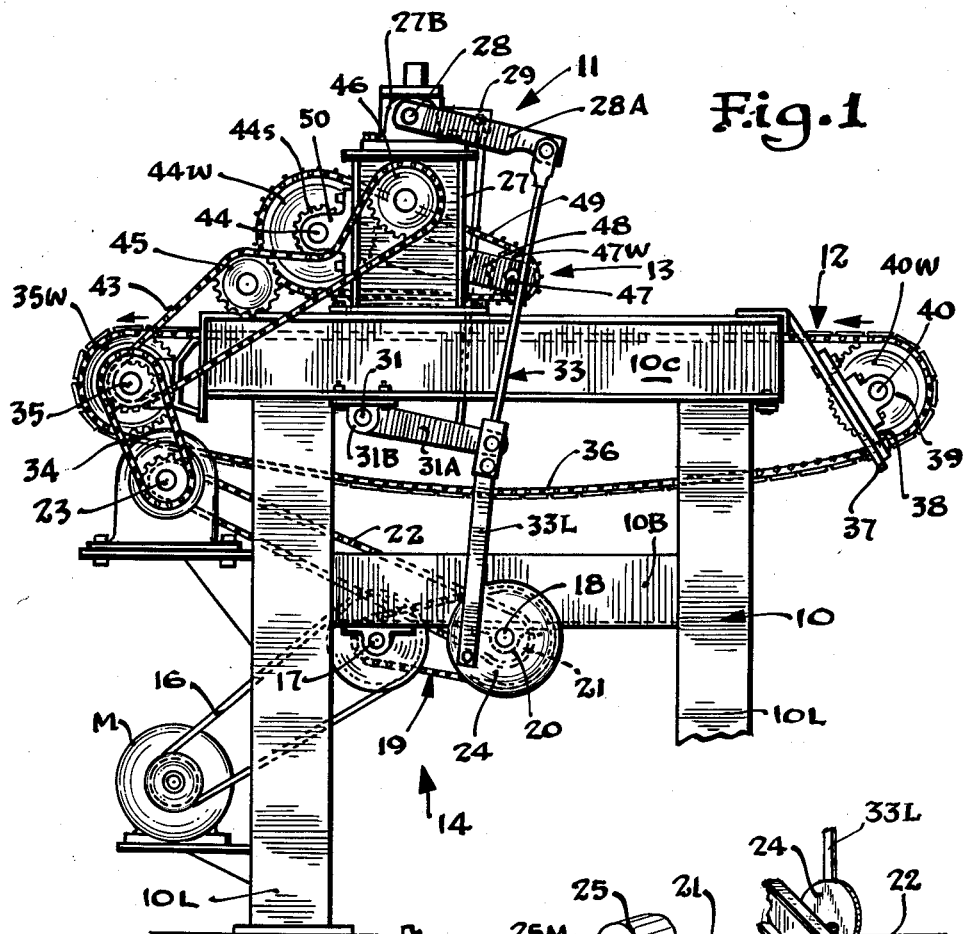
FIG. 1 is a side-elevational view of a meat slicing machine constructed in accordance with the teachings of the present invention.

Referring now to the drawings and particularly to FIG. 1 thereof, the preferred form of meat slicing machine illustrated herein for purposes of disclosure comprises an elongated support frame 10, a slicing station 11 mounted across the top of the frame intermediately along the length thereof and having a set of vertically extending, uniformly, transversely spaced reciprocating knives K (FIG. 3), a main conveyor apparatus 12 movable lengthwise along the top of the frame to transport meat to the slicing station, a feed conveyor mechanism 13 located at the slicing station in intercalated relation with the knives K and spaced above the transport conveyor 12 to floatingly ride upon the meat and forcibly push the same through the slicing station, and a drive mechanism 14 mounted within the bottom of the frame and connected for powering the transport conveyor 12, the feed conveyor 13, and the knives K.

The main support frame 10 of the machine has a set of four vertical legs 10L suitably reinforced by cross braces 10B and connected at their upper ends to support a pair of lengthwise extending rails or channels 10C which carry a generally rectangular table or conveyor bed 15 that extends substantially the length of the frame. The conveyor bed is preferably provided with a series of laterally spaced apart, parallel, upstanding guide ribs 15R that extend forwardly from the location of the knives to the front end of the table (see FIGS. 5, 6, 7, and 9).

Figure 2:
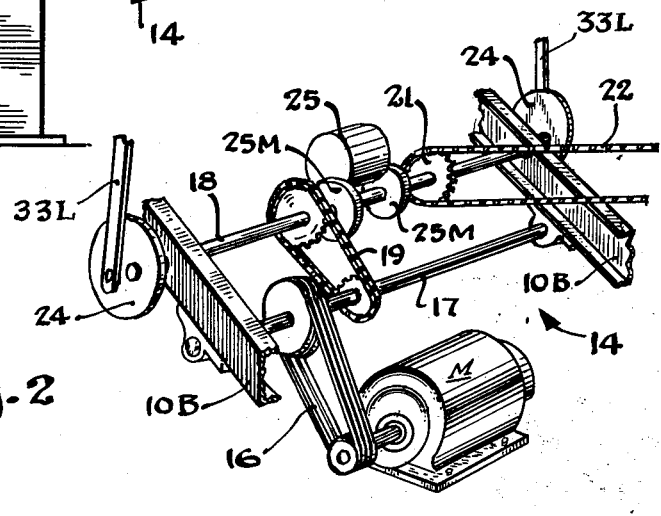
FIG. 2 is a fragmentary perspective view of the power drive mechanism for the machine of FIG. 1.

The drive mechanism, as best shown in FIGS. 1 and 2, includes a motor M driving a belt 16 that is connected in speed-reducing relation to an intermediate shaft 17 journalled to rotate about an axis extending transversely of the main frame 10. A main drive shaft 18 is spaced from and connected in speed-reducing relation to the shaft 17 through a chain and sprocket arrangement that is designated generally at 19. The drive shaft 18 is journalled in bearings 20 (FIG. 1) mounted to depend from the cross braces 10B of the main frame, and it carries a drive sprocket 21 for driving a chain 22 that is connected in speed-reducing relation to an idler shaft 23. At each of its opposite ends, the main drive shaft 18 carries a crank wheel 24 located thereon at a point outboard of the main frame 10 and connected to reciprocate the knives K of the slicing station. A counterweight 25 is fixed between a pair of mounting plates 25M which mount it in eccentric relation to the drive shaft 18, and the counterweight is proportioned and positioned to provide a balance with the reciprocating knives and their driving linkage.

At the slicing station, upstanding support post sructure 27 is provided on each of the channels 10C, and each support post structure includes a bearing block 27B for rotatably supporting an upper rock shaft 28 that is provided with a series of sets of attachment bars 29 (FIG. 3), the bars of each set having registering openings adjacent their free ends for the mounting of fastener pins that secure the upper ends of the knives K. A header 30 is mounted on a set of blocks 30B keyed to the rock shaft and is bridged across the top of the attachment bars 29 with knife take-up screws 30S (FIG. 4) carried in the header for holding the attachment bars 29 in fixed angular position with respect to the rock shaft 28 to undergo oscillating movement jointly therewith. A set of depending bearing blocks 31B (FIG. 1) is fixed along the underneath edge of the channels 10C to support a lower rock shaft 31 which is also fitted with a series of sets of attachment bars 32 (see FIGS. 3 and 4) for securement in a similar fashion to the bottom ends of the knives K. At each end, the cross shafts 28 and 31 have axial end extensions that project outboard of the support frame and are provided with crank arms 28A and 31A, respectively. The outer ends of these crank arms are pivotally connected to opposite ends of vertically reciprocable driving rod assemblies 33, the bottom end of each of which is pivotally connected to a corresponding link 33L which is pinned to one of the crank wheels 24.

Rotation of the crank wheels 24 rocks the crank arms 28A and 31A and their associated rock shafts 28 and 31 to reciprocate the knives K in a generally vertical direction. As the rock shafts rotate counterclockwise, as viewed in FIG. 4, the attachment bars 29 and 32 are also swung counterclockwise to move the knives K upwardly, while clockwise rotation of these parts moves the knives downwardly. During the up-stroke of the knives, the counterweight 25 is moving generally downwardly along its circular path of motion, and it supplies energy to assist the motor in elevating the knife assembly. On the downstroke, energy is transferred from the knife assembly to lift the counterweight, and this arrangement smooths out the loading cycle on the motor M.

The intermediate idler shaft 23 is connected by a chain and sprocket assembly 34 to rotate a drive shaft 35 for the transport conveyor 12. The shaft 35 is journalled in bearings at the discharge end of the support frame. A set of ganged sprocket wheels 35W (FIG. 9) are keyed to the shaft 35 and are engaged with link type chains 36 of stainless steel or other suitable sanitary material. At the entrance end of the machine, support brackets 37 (FIGS. 1 and 9) are fixedly mounted to the channels 10C to extend downwardly and forwardly therefrom and mounting bars 38 are releasably secured to these brackets to mount bearing blocks 39 which rotatably support an idler shaft 40 at the front of the transport conveyor. A corresponding set of ganged sprocket wheels 40W are mounted on the idler shaft 40 to engage the chains 36.

The upper run of each chain overlies and runs horizontally along the conveyor bed 15 to support and transport the meat. The lengthwise extending guide ribs or rails 15R that are provided on the conveyor bed border and define a set of operating grooves for the chains. The meat-supporting surface of the transport conveyor is comprised of a series of closely spaced stainless steel pads 42 secured along the length of each chain. As shown in FIG. 8, each support pad 42 is provided with a loop-shaped metal strap 42S on its underneath face and the links of each chain are formed with integral hook portions 36H arranged to extend transversely in overhanging cantilever fashion across the top of the link to engage in the space between the strap 42S and its support pad 42. With the hook 36H in position in the notch, the metal strap is hit with a punch that is movable through the open center of the corresponding chain link to secure the parts.

This articulated multiple-pad construction provides the freedom necessary for the transport conveyor to move around the relatively small turning radius at the transport conveyor sprockets 35W and 40W. The width and line of movement of the pads is correlated with the knife spacings to insure against conflict between the pads and the knives. The guide ribs 15R on the conveyor bed maintain the desired alignment of the chains in the spaces between the knives. In addition, these guide ribs project above the conveyor bed sufficiently to terminate in substantially flush relationship with the support surface provided by the support pads 42 (see FIG. 7).

It will be apparent that the chunk of meat merely rides upon the moving surface provided by the pads of the transport conveyor 12, and the feed conveyor 13 which overhangs this surface applies a positive feeding action for forcing the meat through the knives at the slicing station without mutilation thereof. It should be noted that the knives should have sharp, smooth edges as opposed to a saw-tooth configuration to avoid a hacking and resultant discoloration along the surfaces of the meat where the cutting occurs.

The meat feed conveyor is driven from shaft 35 by a link chain 43 which is trained about a sprocket 44S on a main drive shaft 44, and about a pair of idler sprockets 45 and 46 located at suitably spaced points outboard of the main frame. A floating driven shaft 47 is journalled for rotation in the outer ends of swing bars 48 (see FIG. 3) that pivot about the drive shaft 44. Corresponding sets of ganged sprocket wheels 44W and 47W are provided on the shafts 44 and 47, respectively, and a set of stainless steel link chains 49 is engaged taut around corresponding sprockets to travel through the spaces between the knives K.

The main drive shaft 44 of the feed conveyor is journalled in bearings 50 that are stationarily mounted along the rear of the support post structures 27, while the mounting of the driven shaft 47 is such that it is capable of a swinging motion about the axis of the drive shaft. Since these shafts are spaced apart generally horizontally but with the drive shaft 44 somewhat higher than the driven shaft 47, the swinging motion of the driven shaft 47 in adjusting to the size of the chunk of meat results in essentially vertical displacement thereof. The stainless steel link chains 49 are provided with projections or teeth 49T (FIG. 3) that bite into the chunk of meat to provide a positive feeding action; and the weight of the floating driven shaft, together with its sprockets and chains, is sufficient to insure that the teeth get a secure bite in the meat.

The floating mounting of the driven shaft allows automatic adjustment of the feed conveyor to the handling of chunks of meat ranging from about ½″ to about 8″ in thickness. A taut mounting of the feed chains 49 on the sprockets 44 and 47 is important for maintaining feeding engagement with the meat sufficient to insure that the meat is pushed completely through and beyond the knives, without becoming wedged or otherwise entangled at the slicing station. In this connection, it is also important that the knives K are located toward the forward end of the feed conveyor 13.

To support the floating sprocket shaft 47, it is provided with integral, axially extending ends 47E that rest on top of support blocks 47B fixed to each of the channel rails 10C. The height of the blocks 47B is sufficient to maintain the feed chains 49 and their teeth 49T free from contact with the support pads 42 of the transport conveyor. A clearance space of about ½″ is suitable.

The operation of the apparatus will be self-evident. The chunk of meat is placed upon the approach section of the transport conveyor to ride along until it comes between the conveyor transport surface and the moving chains 49 of the feed conveyor. At this time, the floating shaft 47 of the feed conveyor rides up as necessary to accommodate the entrance of the meat and, due to the weight of the mechanism, its teeth-like projections sink into the meat and force it through and beyond the knives and onto the delivery section of the transport conveyor.

Since the primary application of the device is for producing cubes of meat, a chunk of meat is fed through a first time to cut it into thin slices; then the slices are fed through and are cut into elongated strips; and then the strips are fed through cross-wise and are finally cut into cubes. The floating action of the feed conveyor accommodates the progessively smaller pieces of meat.

Where the volume of the operation warrants it, the machine may be elongated and provided with three slicing stations to permit meat to be cut into cubes on a single passage through the machine. Such an arrangement is shown diagrammatically in FIG. 10, wherein the transport conveyor 12 is shown spanning three slicing stations. At the first slicing station 11A, the chunk of meat is cut into slices and is fed to an approach section 12B that leads to a second slicing station 11B. While on this approach section, the slices, if necessary, may be manually positioned so that they will be cut into elongated strips which are then delivered to the approach section 12C that leads to the third slicing station 11C; and at this point, the strips are positioned crosswise of the knives to permit their final formation into cubes.

With this arrangement, the range of floating movement of the driven shaft of the feed conveyor at the first station may be reduced considerably from that which is provided in the single-station embodiment of the invention. Correspondingly, substantially no range of floating movement is required at the second and third slicing stations, though it is still preferred that the floating type feed conveyor be employed at these stations.

An suitable power drive arrangement may be employed to connect the driving motor to each of the three slicing stations, and preferably a common driving linkage is employed for driving all of the stations simultaneously. The details of such an arrangement will be apparent in view of the previous disclosure.

It will be apparent from the arrangement of the drive mechanism that the feed conveyor chains 49 are driven at approximately the same speed as are the transport conveyor chains 36; and in one operative embodiment of the invention, both sets of chains travel at a rate of about 9 inches per second. The cutting knives may undergo a total travel of 2" in each direction of its reciprocating vertical movement so that in one motion cycle, each cutting knife travels 4" while each set of chains preferably travels about ⅔". This speed ratio assures a cleaner cutting action.

The foregoing description and the drawings are given merely to explain and illustrate the invention and the manner in which it may be performed, and the invention is not to be limited thereto except insofar as the appended claims are so limited, since those skilled in the art who have this disclosure before them will be able to make modifications and variations therein without departing from the scope and spirit of the invention.

I claim:

1. Meat slicing apparatus comprising a horizontally elongated support frame, a slicing station mounted at an intermediate position lengthwise along said frame and having a plurality of vertically oriented, power driven knife elements spaced laterally across said frame, a conveyor bed affixed in horizontally elongated relation on said frame and provided with laterally spaced, lengthwise extending operating slots for said knife elements, said conveyor bed having laterally spaced, lengthwise extending, parallel, upstanding guide rails at the region of said slicing station and interrupted by said operating slots, a series of side-by-side arranged chain-like endless loop elements, each endless loop element having an upper run supportedly overlying said conveyor bed, lengthwise thereof, and disposed between a pair of said rails in close fit laterally guided relationship thereto, said loop elements providing, along said upper run thereof, horizontal coplanar movable support surfaces spaced apart laterally only slightly greater than the thickness of the knife element therebetween to run in close lateral clearance relation thereto, drive means for moving said loop elements simultaneously to advance the upper runs thereof uniformly along said conveyor bed, and feeding mechanism comprising a frame mounted shaft rotatable about a lateral axis above said conveyor bed and driving a plurality of laterally spaced lengthwise movable meat-engaging feed surfaces disposed in intercalated relation to said knives, and means mounting said feed surfaces in vertically floating relation above said conveyor bed to engage meat on said movable support surfaces and force the same through said knife elements.

2. The arrangement of claim 1 wherein each loop element is equipped with lengthwise closely spaced pads to provide said movable support surfaces, said pads on each loop element extending laterally thereof to engage the guide rails adjacent thereto in close fit laterally guided relation.

3. The arrangement of claim 1 wherein said loop elements are link chains, each equipped with lengthwise closely spaced pads to provide said movable support surfaces, said pads on each chain extending laterally thereof to overhang side regions of said rails and to be substantially flush and planar with upraised center regions of said rails.

4. Meat slicing apparatus comprising a horizontally elongated support frame, a slicing station mounted at an intermediate position lengthwise along said frame and having a plurality of vertically oriented, power driven knife elements spaced laterally across said frame, a conveyor bed affixed in horizontally elongated relation on said frame and provided with laterally spaced, lengthwise extending operating slots for said knife elements, said conveyor bed having laterally spaced, lengthwise extending, parallel, upstanding guide rails at the region of said slicing station and interrupted by said operating slots, a series of side-by-side arranged chain-like endless loop elements, each endless loop element having an upper run supportedly overlying said conveyor bed, lengthwise thereof, and disposed between a pair of said rails in close fit laterally guided relationship thereto, said loop elements providing, along said upper run thereof, horizontal coplanar movable support surfaces spaced apart laterally only slightly greater than the thickness of the knife element therebetween to run in close lateral clearance relation thereto, drive means for moving said loop elements simultaneously to advance the upper runs thereof uniformly along said conveyor bed, and feeding mechanism comprising a ganged drive sprocket rotationg about an axis extending transversely of said frame and located above said conveyor bed and to the rear of said knives, a ganged follower sprocket rotatable about an axis located forwardly of said knives and mounted for vertical floating movement above said conveyor bed and a series of parallel feed chains engaged around said sprockets and intercalated with said knives to move horizontally therebetween in elevated relation to said support surfaces to engage against meat disposed thereon and force the same through said knives.

5. Meat slicing apparatus comprising a horizontally elongated support frame, a slicing station mounted at an intermediate position lengthwise along said frame and having a plurality of vertically oriented, power driven knife elements spaced laterally across said frame, a conveyor bed affixed in horizontally elongated relation on said frame and provided with laterally spaced, lengthwise extending operating slots for said knife elements, said conveyor bed having laterally spaced, lengthwise extending, parallel, upstanding guide rails at the region of said slicing station and interrupted by said operating slots, a series of side-by-side arranged chain-like endless loop elements, each endless loop element having an upper run supportedly overlying said conveyor bed, lengthwise thereof, and disposed between a pair of said rails in close fit laterally guided relationship thereto, said loop elements providing, along said upper run thereof, horizontal coplanar movable support surfaces spaced apart laterally only slightly greater than the thickness of the knife element therebetween to run in close lateral clearance relation thereto, drive means for moving said loop elements simultaneously to advance the upper runs thereof uniformlly along said conveyor bed, and feeding mechanism comprising a drive axle having a ganged set of drive sprocket wheels thereon, said drive axle extending transversely of said frame and being located above said support surfaces and to the rear of said knives, a follower axle having a ganged set of follower sprocket wheels thereon and located above said support surfaces and forwardly of said knives, swing bars journalled at one end thereof on said drive axle for swinging movement thereabout and extending forwardly of said knives to support said follower axle for vertical swinging floating movement, and a series of parallel feed chains engaged around corresponding ones of said drive and follower sprockets and intercalated with said knives to move horizontally therebetween in elevated relation to said support surfaces to engage against meat disposed thereon and force the same through said knives.

References Cited in the file of this patent

UNITED STATES PATENTS

| 2,147,322 | Tuthill et al. | Feb. 14, 1939 |
| 2,837,131 | Fried | June 3, 1958 |

FOREIGN PATENTS

| 16,704 | Sweden | Nov. 28, 1903 |
| 120,300 | Great Britain | Nov. 7, 1918 |
| 141,833 | Switzerland | Oct. 16, 1930 |
| 79,513 | Norway | Dec. 17, 1951 |